(12) United States Patent
Ohzeki (10) Patent No.: US 7,881,492 B2
(45) Date of Patent: Feb. 1, 2011

(54) ELECTRONIC WATERMARK EMBEDDING APPARATUS AND METHOD AND ELECTRONIC WATERMARK EXAMINING APPARATUS AND METHOD

(75) Inventor: Kazuo Ohzeki, Tokyo (JP)

(73) Assignee: Shibaura Institute of Technology, Tokyo (JP)

( * ) Notice: Subject to any disclaimer, the term of this patent is extended or adjusted under 35 U.S.C. 154(b) by 0 days.

(21) Appl. No.: 12/665,601

(22) PCT Filed: Dec. 14, 2007

(86) PCT No.: PCT/JP2007/074101

§ 371 (c)(1),
(2), (4) Date: Apr. 8, 2010

(87) PCT Pub. No.: WO2009/078071

PCT Pub. Date: Jun. 25, 2009

(65) Prior Publication Data

US 2010/0202651 A1    Aug. 12, 2010

(51) Int. Cl.
*H04K 1/00* (2006.01)

(52) U.S. Cl. .................................. 382/100
(58) Field of Classification Search ............ 382/100, 382/232; 713/176; 380/287, 54, 55
See application file for complete search history.

(56) References Cited

U.S. PATENT DOCUMENTS 7,489,797 B2    2/2009  Izquierdo 7,587,063 B2    9/2009  Hwang et al.
2004/0081318 A1   4/2004  Bilobrov et al.

FOREIGN PATENT DOCUMENTS

| JP | 2005-223651 A | 8/2005 |
|---|---|---|
| JP | 2006-505191 A | 2/2006 |
| WO | WO2004/040899 A2 | 5/2004 |

OTHER PUBLICATIONS

Notice of Allowance for U.S. Appl. No. 12/665,308 mailed May 13, 2010.

(Continued)

*Primary Examiner*—Andrew W Johns
(74) *Attorney, Agent, or Firm*—Foley & Lardner LLP (57) ABSTRACT

An electronic watermark embedding apparatus includes means for storing a pixel matrix G with n rows and n columns of an input image, means for acquiring eigenvalues $s_1$ to $s_n$ and eigenvectors $p_1$ to $p_n$ of the pixel matrix G, means for selecting at least one pair of eigenvalues $(s_i, s_j)$ having different values from the eigenvalues $s_1$ to $s_n$ and correcting the eigenvalues $s_1$ to $s_n$ such that the values of the selected pair can be equal, means for creating a Jordan-normal-form matrix $S_w$ having the corrected eigenvalues as diagonal elements and 1 as one of the nondiagonal elements corresponding to the selected pair, means for outputting the eigenvectors $p_1$ to $p_n$ as electronic watermark key information, means for performing the inverse transform of diagonalization computing on the created matrix $S_w$ by using the eigenvectors $p_1$ to $p_n$ to create a pixel matrix $G_w$ with n rows and n columns thereby and outputting it as an electronic-watermark-embedded image of the input image.

11 Claims, 6 Drawing Sheets

OTHER PUBLICATIONS

Liu, et al., "An SVD-Based Watermarking Scheme for Protecting Rightful Ownership," IEEE Transactions on Multimedia, vol. 4, No. 1, pp. 121-128, Mar. 2002.

Sugiyama, et al., "A Cropping-Robust Watermarking Method Based on Singular Value Decomposition and Haar Transformation," Information and Communication engineers D-II, 2002, vol. J85-D-II, No. 5, pp. 877-885.

Zhang, et al., Comments on "An SVD-Based Watermarking Scheme for Protecting Rightful Ownership," IEEE Transactions on Multimedia, vol. 7, No. 2, pp. 593-594, Apr. 2005.

International Search Report for PCT/JP2007/074101 mailed Jan. 15, 2008 (Translation attached).

(A)
$$\begin{bmatrix} 236 & 10 & 11 & 12 \\ 12 & 177 & 12 & 10 \\ 10 & 12 & 174 & 12 \\ 10 & 12 & 14 & 222 \end{bmatrix}$$

(B)
$$\begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix} = \begin{bmatrix} 249.7 & 0 & 0 & 0 \\ 0 & 217.1 & 0 & 0 \\ 0 & 0 & 179.0 & 0 \\ 0 & 0 & 0 & 163.3 \end{bmatrix}$$

(C)
$$\begin{bmatrix} P_1 & | & P_2 & | & P_3 & | & P_4 \end{bmatrix} = \begin{bmatrix} 0.799 & 0.592 & 0.164 & -0.023 \\ 0.238 & -0.052 & -0.723 & -0.622 \\ 0.224 & -0.099 & -0.573 & 0.780 \\ 0.505 & -0.798 & 0.350 & -0.055 \end{bmatrix}$$

(D)
$$\begin{bmatrix} 249.7 & 0 & 0 & 0 \\ 0 & 217.1 & 0 & 0 \\ 0 & 0 & 179.0 & 0 \\ 0 & 0 & 0 & 179.0 \end{bmatrix}$$

(E)
$$\begin{bmatrix} 236 & 10 & 11 & 12 \\ 12 & 184 & 4 & 11 \\ 10 & 5 & 183 & 11 \\ 10 & 12 & 14 & 222 \end{bmatrix}$$

ELECTRONIC WATERMARK EMBEDDING APPARATUS AND METHOD AND ELECTRONIC WATERMARK EXAMINING APPARATUS AND METHOD

CROSS-REFERENCE TO RELATED APPLICATIONS

The present application is a U.S. national stage application claiming the benefit of International Application No. PCT/JP2007/074101, filed on Dec. 14, 2007, the entire contents of which is incorporated herein by reference in its entirety.

TECHNICAL FIELD

The present invention relates to a technology that embeds an electronic watermark to an image, for example, and a technology that examines whether an electronic watermark is contained in an image or not, for example.

BACKGROUND ART

Hitherto, various electronic watermark schemes have been proposed and been developed. It is difficult to remove an electronic watermark from an image unless the key information for extracting it is available. Therefore, it is being widely used for the purpose of copyright protection, such as the prevention of tampering and illegal copy of images.

For example, Non-Patent Document 1 proposes an electronic watermark method using singular value decomposition (SVD).

More specifically, in order to embed an electronic watermark, singular value decomposition is performed on an original image A to acquire a singular value S and singular vectors U and V. Next, an electronic watermark W is embedded to the singular value S to create (S+αW). This further undergoes singular value decomposition to acquire a singular value $S_w$ and singular vectors $U_w$ and $V_w$. Then, the singular value $S_w$ is multiplied by the singular vectors U and $V^T$, which are acquired by the first singular value decomposition, from both sides to create an electronic-watermark-embedded image $A_w$ (=$US_wV^T$).

In order to detect an electronic watermark, singular value decomposition is performed on an examination target image $A_w{}^*$ to acquire the singular value $S_w{}^*$. Next, the singular value $S_w{}^*$ is multiplied by the singular vectors $U_w{}^*$ and $V_w{}^*T$ from both sides to calculate $D^*(=U_w{}^*S_w{}^*V_w{}^{*T})$. Then, $W^* = (D^*-S)/\alpha$ acquired by performing expression transformation on $D^* = (S+\alpha W^*)$ is used to detect an electronic watermark $W^*$.

[Non-Patent Document 1] Ruizhen Liu et al, "An SVD-Based Watermarking Scheme for Protecting Rightful Ownership", IEEE Transactions on Multimedia, March in 2002, Vol. 4, No. 1, pp. 121-128

[Non-Patent Document 2] Xiao-Ping Zhang, "Comments on "An SVD-Based Watermarking Scheme for Protecting Rightful Ownership", IEEE Transactions on Multimedia, April in 2005, Vol. 7, No. 2, pp. 593-594

DISCLOSURE OF INVENTION

Problems to be Solved by the Invention

However, the scheme described in Non-Patent Document 1 does not clarify the mathematical meaning of the application of the singular vectors U and V by the first singular value decomposition to $S_w$ acquired by the second singular value decomposition, and, as a result, how the acquired watermark-embedded image $A_w$ relates to the original image A is not clear.

Regarding the scheme, the problem has been pointed out that an electronic watermark dependent on the singular vectors $U_w{}^*$ and $V_w{}^*$ to be used for detection is detected regardless of both examination target image $A_w{}^*$ and actually embedded electronic watermark W (Non-Patent Document 2).

Accordingly, it is an object of the present invention to solve the problem and provide an inventive electronic watermarking scheme with high resistance.

Means for Solving the Problems

An electronic watermark embedding apparatus of the present invention includes input image storage means for storing a pixel matrix G with n rows and n columns of an input image, eigenvalue-and-vector calculating means for acquiring eigenvalues $s_1$ to $s_n$ ($s_1 > s_2 > \ldots > s_n$) and eigenvectors $p_1$ to $p_n$ of the pixel matrix G read from the input image storage means, eigenvalue correcting means for selecting at least one pair of eigenvalues ($s_i, s_j$) having different values from the acquired eigenvalues $s_1$ to $s_n$ and correcting the acquired eigenvalues $s_1$ to $s_n$ such that the values of the selected pair can be equal, means for creating a Jordan-normal-form matrix $S_w$ having the corrected eigenvalues as diagonal elements and 1 as one of the nondiagonal elements corresponding to the selected pair, means for outputting the acquired eigenvectors $p_1$ to $p_n$ as electronic watermark key information, means for performing the inverse transform of diagonalization computing on the created matrix $S_w$ by using the acquired eigenvectors $p_1$ to $p_n$ to create a pixel matrix $G_w$ with n rows and n columns thereby and outputting it as an electronic-watermark-embedded image of the input image.

Preferably, the eigenvalue correcting means replaces one value of the selected pair by the other value to correct the acquired eigenvalues $s_1$ to $s_n$ such that the selected pair can have equal values.

Preferably, the electronic watermark embedding apparatus further includes original image storage means for storing an original image which is to be the target for embedding an electronic watermark, means for cutting out a partial image of n×n pixels from the original image and storing a pixel matrix of the partial image in the input image storage means as the pixel matrix G with n rows and n columns of the input image, and means for replacing the partial image in the original image by the electronic-watermark-embedded image of the input image to create an electronic-watermark-embedded image of the original image and outputting it.

Preferably, if the pixel matrix G is an irregular matrix of a rank r (r<n), the eigenvalue-and-vector calculating means determines one or more positive values, each of which is lower than the eigenvalue $s_r$, as the eigenvalues $s_{(r+1)}$ to $s_n$ of the pixel matrix G and determines one or more fundamental vectors as the eigenvector of the determined eigenvalues $s_{(r+1)}$ to $s_n$.

An electronic watermark examining apparatus of the present invention includes examination target image storage mean for storing a pixel matrix $G_k$ with n rows and n columns of an examination target image, key information storage means for storing eigenvectors $p_1$ to $p_n$ of a pixel matrix G with n rows and n columns of an input image as electronic watermark key information, means for performing diagonalization computing on the pixel matrix $G_k$, which is read from the examination target image storage means, by using the eigenvectors $p_1$ to $p_n$ to create a matrix $S_k$ with n rows and n columns, and determining means for determining whether the created matrix $S_k$ corresponds to a Jordan-normal-form matrix or not, and, if so, determines the examination target image is an electronic-watermark-embedded image of the input image and outputting the determination result.

Preferably, the key information storage means further stores eigenvalues $s_1$ to $s_n$ ($s_1 > s_2 > \ldots > s_n$) of the pixel matrix G with n rows and n columns of the input image as electronic watermark key information, and the determining means determines whether the created matrix $S_k$ corresponds to a Jordan-normal-form matrix $S_w$ with n rows and n columns having m ($1 \leq m < n$) eigenvalues being one of the eigenvalues $s_1$ to $s_n$ and the remaining (n–m) eigenvalues being a multiple root with one of the m eigenvalues or not, and, if so, determines that the examination target image is an electronic-watermark-embedded image of the input image.

Preferably, the key information storage means further stores the Jordan-normal-form matrix $S_w$ as electronic watermark key information, the determining means determines whether the created matrix $S_k$ corresponds to the Jordan-normal-form matrix $S_w$ or not, and, if so, determines that the examination target image is an electronic-watermark-embedded image of the input image, and the Jordan normal form $S_w$ is a Jordan-normal-form matrix acquired by selecting at least one pair of eigenvalues $(s_i, s_j)$ having different values from eigenvalues $s_1$ to $s_n$ ($s_1 > s_2 > \ldots > s_n$) of the pixel matrix G, correcting the acquired eigenvalues $s_1$ to $s_n$ such that the selected pair can have equal values, setting the corrected eigenvalues as diagonal elements, and setting 1 as one of the nondiagonal elements corresponding to the selected pair.

An electronic watermark embedding method of the present invention includes the step of reading a pixel matrix G with n rows and n columns of an input image from input image storage means storing the pixel matrix G, an eigenvalue and vector calculating step of acquiring the eigenvalues $s_1$ to $s_n$ ($s_1 > s_2 > \ldots > s_n$) and eigenvectors $p_1$ to $p_n$ of the read pixel matrix G, an eigenvalue correcting step of selecting at least one pair of eigenvalues $(s_i, s_j)$ having different values from the acquired eigenvalues $s_1$ to $s_n$ and correcting the acquired eigenvalues $s_1$ to $s_n$ such that the selected pair can have equal values, the step of creating a Jordan-normal-form matrix $S_w$ having the corrected eigenvalues as diagonal elements and having 1 as one of the nondiagonal elements corresponding to the selected pair, the step of outputting the acquired eigenvectors $p_1$ to $p_n$ as electronic watermark key information, and the step of performing the inverse transform of diagonalization computing on the created matrix $S_w$ by using the acquired eigenvectors $p_1$ to $p_n$ to create a pixel matrix $G_w$ with n rows and n columns thereby and outputting it as an electronic-watermark-embedded image of the input image.

An electronic watermark examining method of the present invention includes the steps of reading a pixel matrix $G_k$ with n rows and n columns of an examination target image from examination target image storage means storing the pixel matrix $G_k$, reading eigenvectors $p_1$ to $p_n$ of a pixel matrix G with n rows and n columns of an input image as electronic watermark key information from key information storage means storing eigenvectors $p_1$ to $p_n$, performing diagonalization computing on the read pixel matrix $G_k$ by using the read eigenvectors $p_1$ to $p_n$ to create a matrix $S_k$ with n rows and n columns, determining whether the created matrix $S_k$ corresponds to a Jordan-normal-form matrix or not, and if the created matrix $S_k$ corresponds to a Jordan-normal-form matrix, determining that the examination target image is an electronic-watermark-embedded image of the input image and outputting the determination result.

The electronic watermark embedding method and electronic watermark examining method of the present invention may be executed by a CPU in a computer. The computer programs for the CPU may be installed or loaded to a computer through a medium such as a CD-ROM, a magnetic $di_{sk}$ and a semiconductor memory or over a communication network, for example.

ADVANTAGES

As described above, according to the present invention, the number of times of diagonalization computing to be performed on an input image is equal to the number of times of the inverse transform of diagonalization computing to be performed for acquiring an electronic-watermark-embedded image. Therefore, there are no mathematically unclear points, unlike conventional schemes.

The eigenvectors to be used for embedding and examination are eigenvectors of an input image and do not include information on an electronic watermark. This can prevent the problem that unintended information on an electronic watermark may mix thereinto due to diagonalization computing and/or the inverse transform of diagonalization computing.

Furthermore, the inverse transform of diagonalization computing is performed on a Jordan normal form $S_w$ having a multiple root to create an electronic-watermark-embedded image. Therefore, due to the difficulty of diagonalization on a irregular matrix when the characteristic equation has a multiple root, it is impossible in effect to acquire correct eigenvectors of an electronic-watermark-embedded image (that is, eigenvectors of an input image) or correct values of a Jordan normal form $S_w$ from the electronic-watermark-embedded image. Therefore, the high confidentiality of electronic watermark key information (which is eigenvectors of an input image) can be achieved, and, as a result, an electronic-watermark-embedded image with high resistance can be created.

BEST MODES FOR CARRYING OUT THE INVENTION

With reference to drawings, configurations and operations of embodiments of the present invention will be described below.

First Embodiment

Figure 1:
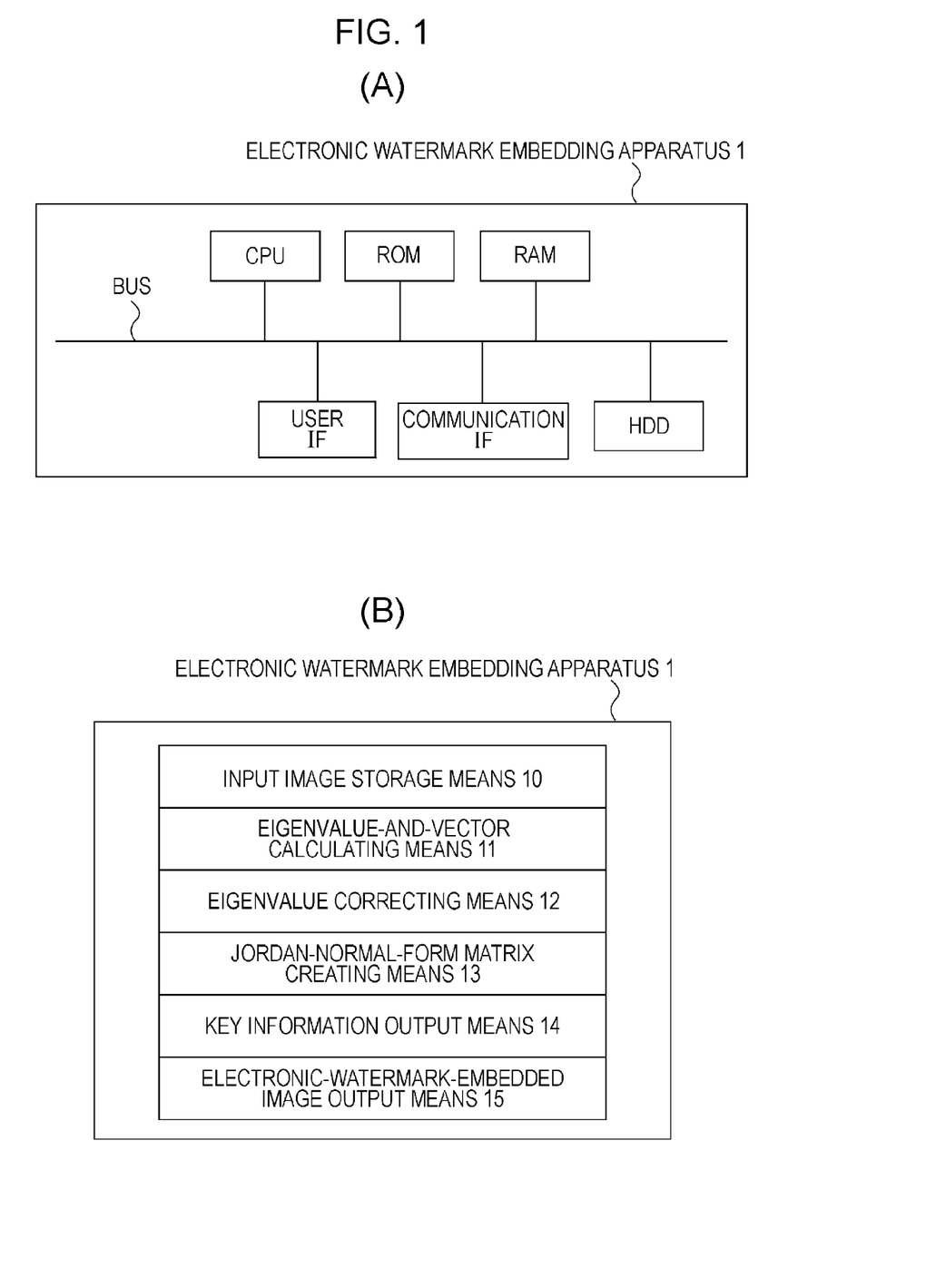
FIG. 1 is a block diagram showing the hardware configuration and function configuration of an electronic watermark embedding apparatus 1 according to a first embodiment.

FIG. 1 is a block diagram showing the configuration of an electronic watermark embedding apparatus according to a first embodiment of the present invention.

As shown in FIG. 1(A), an electronic watermark embedding apparatus 1 includes hardware equivalent to hardware of a normal computer apparatus, such as a CPU, a ROM, a RAM, an HDD, a user interface and a communication interface. The electronic watermark embedding apparatus 1 may physically be either specialized system or generic information processing apparatus. For example, in an information processing apparatus having a general configuration, the electronic watermark embedding apparatus 1 may be implemented by starting software defining processing in an electronic watermark embedding method according to the present invention.

As shown in FIG. 1(B), the electronic watermark embedding apparatus 1 functionally includes input image storage means 10 for storing a pixel matrix G with n rows and n columns of an input image I, eigenvalue-and-vector calculating means 11 for acquiring eigenvalues $s_1$ to $s_n$ ($s_1 > s_2 > \ldots > s_n$) and eigenvectors $p_1$ to $p_n$ of the pixel matrix G read from the input image storage means 10, eigenvalue correcting means 12 for selecting at least one pair of eigenvalues $(s_i, s_j)$ having different values from the acquired eigenvalues $s_1$ to $s_n$ and replacing one of the values of the selected pair by the other value to correct the acquired eigenvalues $s_1$ to $s_n$, Jordan-normal form matrix creating means 13 for creating a Jordan-normal-form matrix $S_w$ having the corrected eigenvalues as diagonal elements and 1 as one of the nondiagonal elements corresponding to the selected pair, key information output means 14 for outputting the acquired eigenvectors $p_1$ to $p_n$ as electronic watermark key information, and means 15 for performing the inverse transform of diagonalization computing on the created matrix $S_w$ by using the acquired eigenvectors $p_1$ to $p_n$ to create a pixel matrix $G_w$ with n rows and n columns thereby and outputting it as an electronic-watermark-embedded image $I_w$ of the input image I.

These means may be implemented as function means by executing, by a CPU, programs stored in a RAM and/or a ROM in the electronic watermark embedding apparatus 1 and/or an external storage medium, for example.

Figure 2:
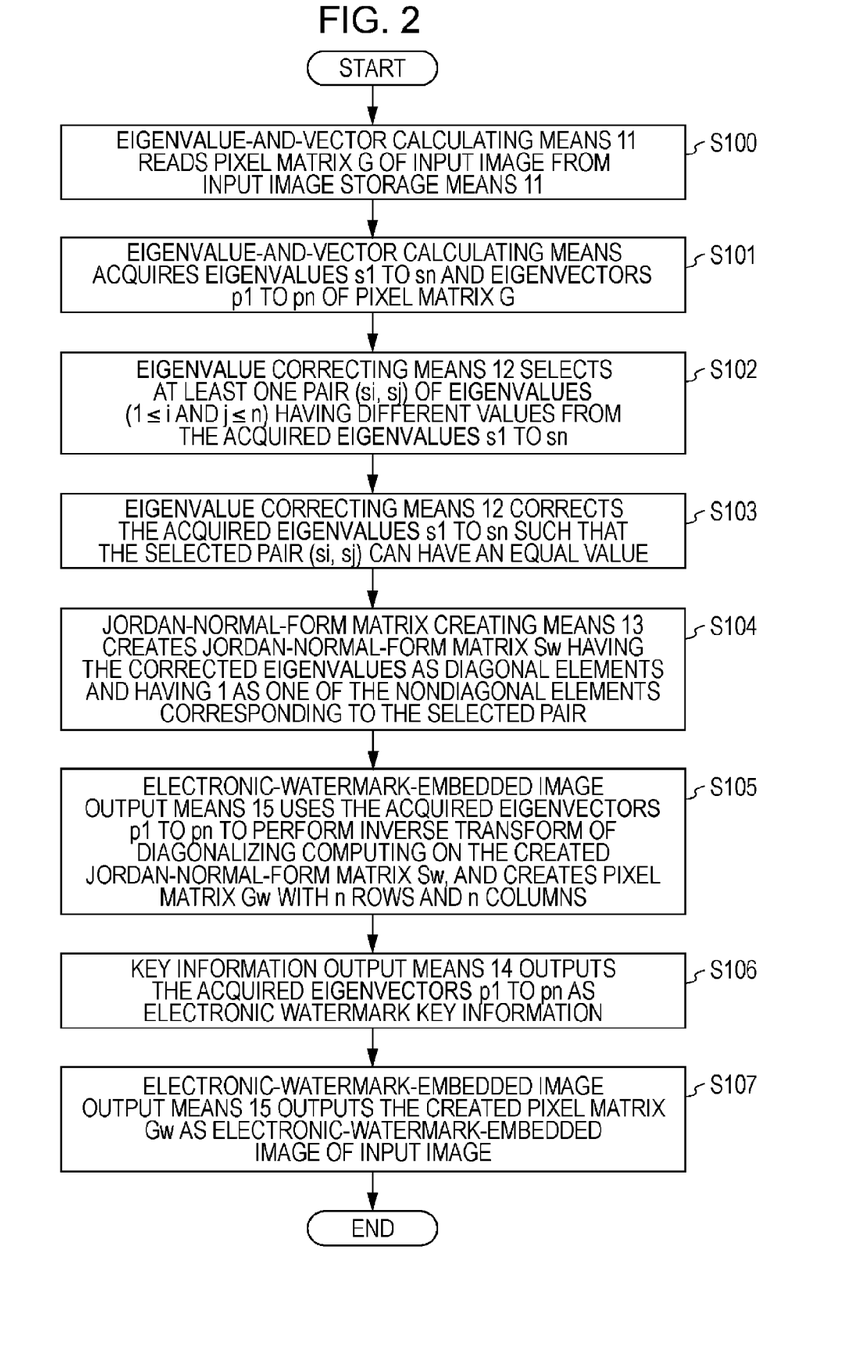
FIG. 2 is a flowchart for describing operations by the electronic watermark embedding apparatus 1.

With reference to the flowchart in FIG. 2, operations by the electronic watermark embedding apparatus 1 will be described below. Notably, the steps (including partial steps with no reference numerals given) can be performed in any order or in parallel unless the processing details contradict each other. The electronic watermark embedding apparatus 1 acquires in advance a pixel matrix G with n rows and n columns (n>1) of an input image I to be processed from an external apparatus (including a server, a memory device, an imaging device and a scanner device) and stores it in the input image storage means 10.

Figure 3:
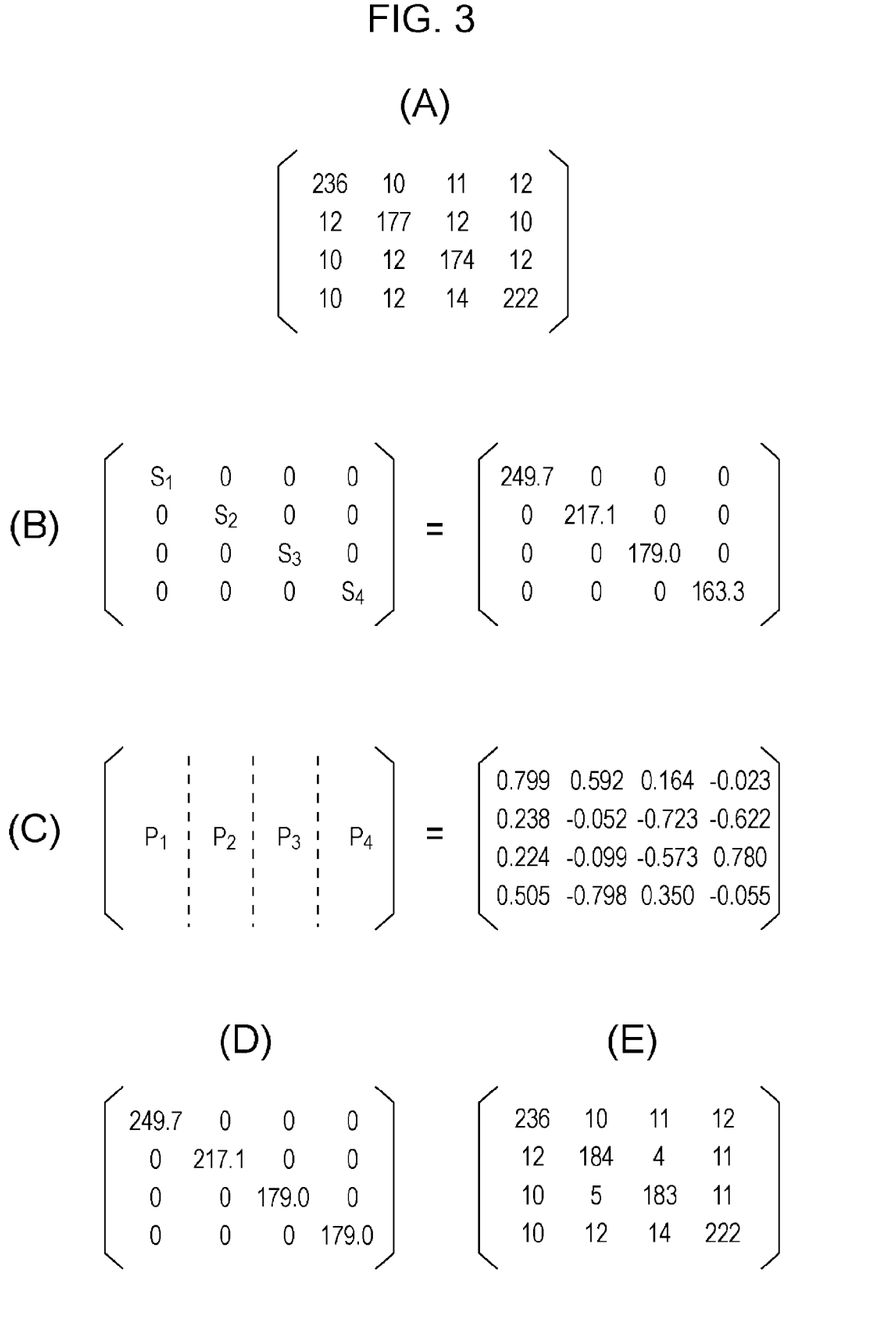
FIG. 3 is a diagram illustrating the process for embedding an electronic watermark with reference to an example.

The eigenvalue-and-vector calculating means 11 reads the pixel matrix G of the input image I from the input image storage means 10 (S100). FIG. 3(A) shows an example of the pixel matrix G when n=4.

Next, the eigenvalue-and-vector calculating means 11 acquires the eigenvalues $s_1$ to $s_n$ ($s_1 > s_2 > \ldots > s_n$) and eigenvectors $p_1$ to $p_n$ of the pixel matrix G (that is, performing diagonalization computing on the pixel matrix G), and stores them in a memory such as a RAM (S101). Notably, an eigenvalue $S_k$ corresponds to an eigenvector $p_k$.

The method for acquiring eigenvalues and eigenvectors may be any of conventional various sequential calculation algorithms (such as power method and QR method). Those algorithms are well known by those skilled in the art, and the programs for executing the algorithms are easily available. Therefore, the details will not be described herein.

When the pixel matrix G is an irregular matrix having a rank r (r<n), the eigenvalue-and-vector calculating means 11 determines one or more positive values, each of which is lower than an eigenvalue $s_r$, as eigenvalues $s_{(r+1)}$ to $s_n$ of the pixel matrix G and determines one or more fundamental vectors as the eigenvectors $p_{(r+1)}$ to $p_n$ of the determined eigenvalues $s_{(r+1)}$ to $s_n$ to complement and acquire the eigenvalues and eigenvectors.

The eigenvalues $s_{(r+1)}$ to $s_n$ may be defined arbitrarily as far as they are positive values lower than the eigenvalue $s_r$.

On the other hand, the eigenvectors $p_{(r+1)}$ to $p_n$ are defined as follows. First of all, a set E of fundamental (unit) vectors having an n-element is assumed, and one fundamental vector is selected from the set E. Then, the fundamental vector is combined with the eigenvectors $p_1$ to $p_r$ to create the matrix with (r+1) columns and n rows. Then, whether the created matrix with (r+1) column and n rows has a rank (r+1) or not is examined. If not, another unselected fundamental vector is selected from the set E, and the matrix with (r+1) columns and n rows is recreated therewith. Then, the rank is examined again. If the rank is (r+1), the selected fundamental vector is defined as the eigenvector $p_{(r+1)}$. This processing is repeated until the rank of the created matrix becomes n, that is, until the eigenvector $P_n$ is defined.

By complementing the rank of the pixel matrix G in this way, the present invention can be applied even when the pixel matrix G is irregular.

FIGS. 3(B) and 3(C) show the eigenvalues $s_1$ to $s_4$ and eigenvectors $p_1$ to $p_4$ acquired for the pixel matrix G shown in FIG. 3(A).

Next, the eigenvalue correcting means 12 selects at least one pair of eigenvalues $(s_i, s_j)$ ($1 \leq i, j \leq n$) having different values from the acquired eigenvalues $s_1$ to $s_n$ (S102).

In this case, in order to minimize the influence on the input image I, an eigenvalue pair is desirably selected having lower absolute values of the eigenvalues and having a smaller difference between the values of the pair. However, some algorithms for acquiring eigenvalues may not allow stable acquisition of lower eigenvalues due to a calculation error. Accordingly, for example, the minimum and next higher eigenvalues may be selected from eigenvalues the absolute values of which are equal to or higher than a threshold value. Such a threshold value may be defined in accordance with the design but is preferably low.

Next, the eigenvalue correcting means 12 corrects the acquired eigenvalues $s_1$ to $s_n$ such that the values $(s_i, s_j)$ of the selected pair can have equal values (S103).

More specifically, for example, one value of the selected pair $(s_i, s_j)$ is replaced by the other value (that is, $s_i' = s_j$ or $s_j' = s_i$). Alternatively, they may be corrected to $s_i' = s_j' = (s_j + s_i)/2$, for example. Notably, the eigenvalues excluding the selected pair are not changed.

Next, the Jordan-normal-form matrix creating means 13 creates a Jordan-normal-form matrix $S_w$ having the corrected eigenvalues as diagonal elements and having 1 as one of the nondiagonal elements corresponding to the selected pair and stores it in a memory such as a RAM (S104). The thus-created Jordan-normal-form matrix $S_w$ is a Jordan-normal-form matrix the characteristic equation of which has a multiple root.

Taking the eigenvalues $s_1$ to $s_4$ shown in FIG. 3(B) as examples, steps S102 to S104 will be described. In step S102, for example, an eigenvalue pair $(s_3, s_4) = (179.0, 163.3)$ is selected. In this case, by correcting it to $s_4' = s_3$ in step S103, the Jordan-normal-form matrix $S_w$ as shown in FIG. 3(D) is created in step S104.

In the framework of the present invention, steps S102 to S104, that is, the correction of the eigenvalues of the pixel matrix G to have a multiple root and the change of the non-diagonal elements corresponding to the eigenvalues having a multiple root to 1 to acquire a Jordan normal form correspond to the step of embedding an electronic watermark.

Next, the electronic-watermark-embedded image output means 15 uses the acquired eigenvectors $p_1$ to $p_n$ to perform the inverse transform of diagonalization computing on the created Jordan-normal-form matrix $S_w$ and creates a pixel matrix $G_w$ with n rows and n columns and stores it in a memory such as a RAM (S105).

Notably, the computing for creating the pixel matrix $G_w$ by the inverse transform of diagonalization computing can be expressed as in:

$$G_w = P S_w P^{-1}$$

where P is a matrix with n rows and n columns having the eigenvectors $p_1$ to $p_n$ as columns.

FIG. 3(E) shows the pixel matrix $G_w$ to be created when the inverse transform of diagonalization computing is performed on $S_w$ shown in FIG. 3(D) by using the eigenvectors $p_1$ to $p_n$ in FIG. 3(C).

Next, the key information output means 14 outputs the acquired eigenvectors $p_1$ to $p_n$ as electronic watermark key information (S106).

Next, the electronic-watermark-embedded image output means 15 outputs the created pixel matrix $G_w$ as an electronic-watermark-embedded image $I_w$ of the input image I (S107).

The outputting in step S106 or S107 may include recording in a RAM of the electronic watermark embedding apparatus 1 or an external memory, for example, and transmitting to other devices.

In this way, in the electronic watermark embedding apparatus 1 of this embodiment, an electronic-watermark-embedded image $I_w$ of an input image I is created by performing diagonalization computing on a pixel matrix G of the input image I to acquire eigenvalues and eigenvectors, correcting the acquired eigenvalues to create a Jordan-normal-form matrix $S_w$ having a multiple root and using the acquired eigenvectors to perform the inverse transform of diagonalization computing on the created Jordan-normal-form matrix $S_w$.

With the configuration of this embodiment, both of the number of times of diagonalization computing to be performed on a pixel matrix G of an input image I and the number of times of inverse transform of diagonalization computing to be performed for acquiring an electronic-watermark-embedded image $I_w$ are one and are matched. Therefore, there are no mathematically unclear points, unlike conventional schemes.

The eigenvectors to be used for the inverse transform of diagonalization computing for embedding an electronic watermark are eigenvectors of an input image I and do not include information on an electronic watermark. This can prevent the problem that unintended information on an electronic watermark may mix thereinto due to the inverse transform of diagonalization computing using eigenvectors.

Furthermore, the inverse transform of diagonalization computing is performed on a Jordan normal form $S_w$ having a multiple root to create an electronic-watermark-embedded image $I_w$. Therefore, due to the difficulty of diagonalization on a singular matrix the characteristic equation of which has a multiple root, it is impossible in effect to acquire correct eigenvectors of an electronic-watermark-embedded image $I_w$ (that is, eigenvectors of an input image I) or correct values of a Jordan normal form $S_w$ from the electronic-watermark-embedded image $I_w$. Therefore, the high confidentiality of electronic watermark key information (which is eigenvectors of an input image I) can be achieved, and, as a result, an electronic-watermark-embedded image $I_w$ with high resistance can be created.

Second Embodiment

Figure 4:
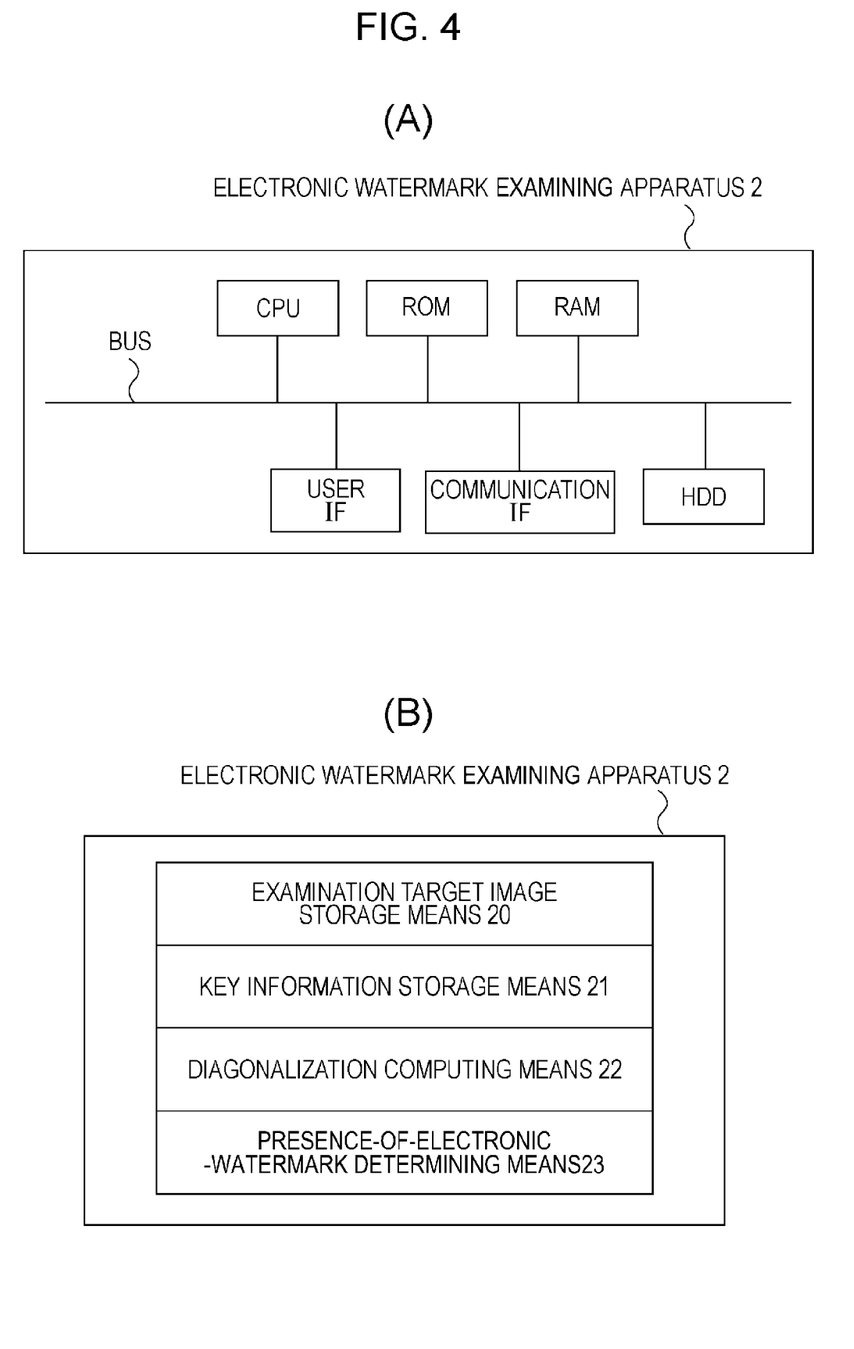
FIG. 4 is a block diagram showing the hardware configuration and function configuration of an electronic watermark examining apparatus 2 of a second embodiment.

FIG. 4 is a block diagram showing the configuration of an electronic watermark examining apparatus according to a second embodiment of the present invention.

As shown in FIG. 4(A), an electronic watermark examining apparatus 2 includes hardware equivalent to hardware of a normal computer apparatus, such as a CPU, a ROM, a RAM, an HDD, a user interface and a communication interface. The electronic watermark examining apparatus 1 may physically be either specialized system or generic information processing apparatus. For example, in an information processing apparatus having a general configuration, the electronic watermark examining apparatus 2 may be implemented by starting software defining processing in an electronic watermark examining method according to the present invention.

As shown in FIG. 4(B), the electronic watermark examining apparatus 2 functionally includes examination target image storage means 20 for storing a pixel matrix $G_k$ with n rows and n columns of an examination target image $I_k$, key information storage means 21 for storing eigenvectors $p_1$ to $p_n$ of a pixel matrix G with n rows and n columns of an input image I as electronic watermark key information, diagonalization computing means 22 for performing diagonalization computing on the pixel matrix $G_k$ read from the examination target image storage means 20 by using the eigenvectors $p_1$ to $p_n$ to create a matrix $S_k$ with n rows and n columns, and presence-of-electronic-watermark determining means 23 for determining whether the created matrix $S_k$ corresponds to a Jordan-normal-form matrix or not, if so, determining that the examination target image $I_k$ is the electronic-watermark-embedded image $I_w$ of the input image I and outputting the determination result.

These means may be implemented as function means by executing, by a CPU, programs stored in a RAM and/or a ROM in the electronic watermark examining apparatus 2 and/or an external storage medium, for example.

Figure 5:
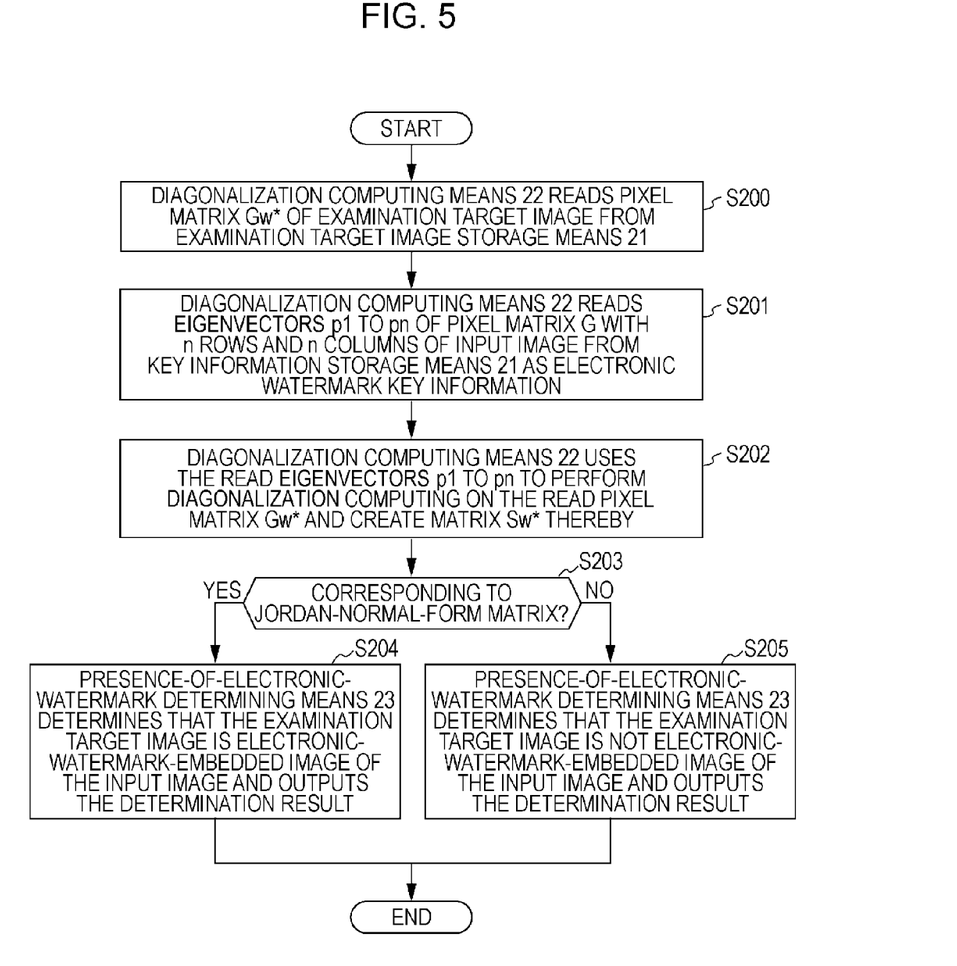
FIG. 5 is a flowchart for describing operations by the electronic watermark examining apparatus 2 of the second embodiment.

With reference to the flowchart in FIG. 5, operations by the electronic watermark examining apparatus 2 will be described below. Notably, the steps (including partial steps with no reference numerals given) can be performed in any order or in parallel unless the processing details contradict each other.

The diagonalization computing means 22 reads a pixel matrix $G_k$ of an examination target image $I_k$ from the examination target image storage means 20 (S200). The examination target image storage means 20 prestores the pixel matrix $G_k$ with n rows and n columns (n>1) of the examination target image $I_k$.

Next, the diagonalization computing means 22 reads eigenvectors $p_1$ to $p_n$ of the pixel matrix G with n rows and n columns of the input image I from the key information storage means 21 as electronic watermark key information (S201).

Here, it is assumed that, in advance, the electronic watermark examining apparatus 2 acquires the eigenvectors $p_1$ to $p_n$ of the pixel matrix G output by the key information output means 14 in the electronic watermark embedding apparatus 1 and stores them in the key information storage means 21. The acquisition of the eigenvectors $p_1$ to $p_n$ may include acquiring them from the electronic watermark embedding apparatus 1 through communication over a network and reading in the electronic watermark examining apparatus 2 the eigenvectors $p_1$ to $p_n$ from a portable memory storing them in the electronic watermark embedding apparatus 1.

Alternatively, the electronic watermark examining apparatus 2 may directly store the pixel matrix G of the input image I in its memory, acquire the eigenvalues $s_1$ to $s_n$ and eigenvectors $p_1$ to $p_n$ of the pixel matrix G and store them in the key information storage means 21.

Next, the diagonalization computing means 22 uses the read eigenvectors $p_1$ to $p_n$ to perform diagonalization computing on the read pixel matrix $G_k$ to create a matrix $S_k$ thereby and stores it in a memory such as a RAM (S202).

Notably, the computing for creating the matrix $S_k$ by diagonalization computing can be expressed by:

$$S_k = P^{-1} G_k P$$

where P is the matrix with n rows and n columns having eigenvectors $p_1$ to $p_n$ as columns.

Next, the presence-of-electronic-watermark determining means 23 determines whether the created matrix $S_k$ corresponds to a Jordan-normal-form matrix or not (S203).

For example, it may be determined that the created matrix $S_k$ corresponds to a Jordan-normal-form matrix if the created matrix $S_k$ has a complete Jordan normal form or, though it does not have a complete Jordan normal form, if it has an element having the absolute value equal to or lower than a threshold value (such as 0.5) instead of "0" element in a Jordan normal form and has an element having the absolute value or the difference from 1 equal to or lower than a threshold value (such as 0.5), instead of "0 or 1" element in a Jordan normal form.

Next, if it is determined that the created matrix $S_k$ corresponds to a Jordan-normal-form matrix, the presence-of-electronic-watermark determining means 23 determines that the examination target image $I_k$ is an electronic-watermark-embedded image $I_w$ of the input image I and outputs the determination result (S204).

On the other hand, if it is determined that the created matrix $S_k$ does not correspond to a Jordan-normal-form matrix, the presence-of-electronic-watermark determining means 23 determines that the examination target image $I_k$ is not an electronic-watermark-embedded image $I_w$ of the input image I and outputs the determination result (S205).

Notably, the outputting in step S204 or S205 may include recording in a RAM in the electronic watermark examining apparatus 2 or an external memory, for example, displaying it to a user through a user interface and transmitting it to other apparatus.

In this way, in the electronic watermark examining apparatus 2 of this embodiment, the eigenvectors $p_1$ to $p_n$ of the pixel matrix G with n rows and n columns of the input image are used to perform diagonalization computing on the pixel matrix $G_k$ of the examination target image $I_k$ and create a matrix $S_k$. If the created matrix $S_k$ corresponds to a Jordan-normal-form matrix, it is determined that the examination target image $I_k$ is the electronic-watermark-embedded image $I_w$ of the input image I. The reason for the determination will be described below.

If the examination target image $I_k$ corresponds to the electronic-watermark-embedded image $I_w$ which is the input image I containing an electronic watermark embedded by the electronic watermark embedding apparatus 1, a matrix certainly corresponding to a Jordan normal form can be acquired when the eigenvectors $p_1$ to $p_n$ of the pixel matrix G of the input image I are used to perform diagonalization computing on the pixel matrix $G_k$ of the examination target image $I_k$ because of the uniqueness of a Jordan normal form.

On the other hand, if the examination target image $I_k$ does not relate to the electronic-watermark-embedded image $I_w$ which is the input image I containing an electronic watermark embedded by the electronic watermark embedding apparatus 1, there may be a significantly low possibility (or substantially no possibilities) that a matrix corresponding to a Jordan normal form can be acquired even when the eigenvectors $p_1$ to $p_n$ of the pixel matrix G of the input image I are used to perform diagonalization computing on the pixel matrix $G_k$ of the examination target image $I_k$.

Therefore, the presence of an electronic watermark can be determined in accordance with whether the created matrix $S_k$ corresponds to a Jordan-normal-form matrix or not.

Notably, with the configuration of this embodiment, the eigenvectors to be used for diagonalization computing in order to examine an electronic watermark are the eigenvectors of the input image, which do not include the information on an electronic watermark. Therefore, this can prevent the problem that unintended information on an electronic watermark may mix thereinto due to the diagonalization.

Variation Examples

The present invention is applicable by being changed in various manners, without limiting to the embodiments.

For example, in the first embodiment, a partial image cut out from an original image $I_o$ which is to be the target for embedding an electronic watermark may be the input image I.

Figure 6:
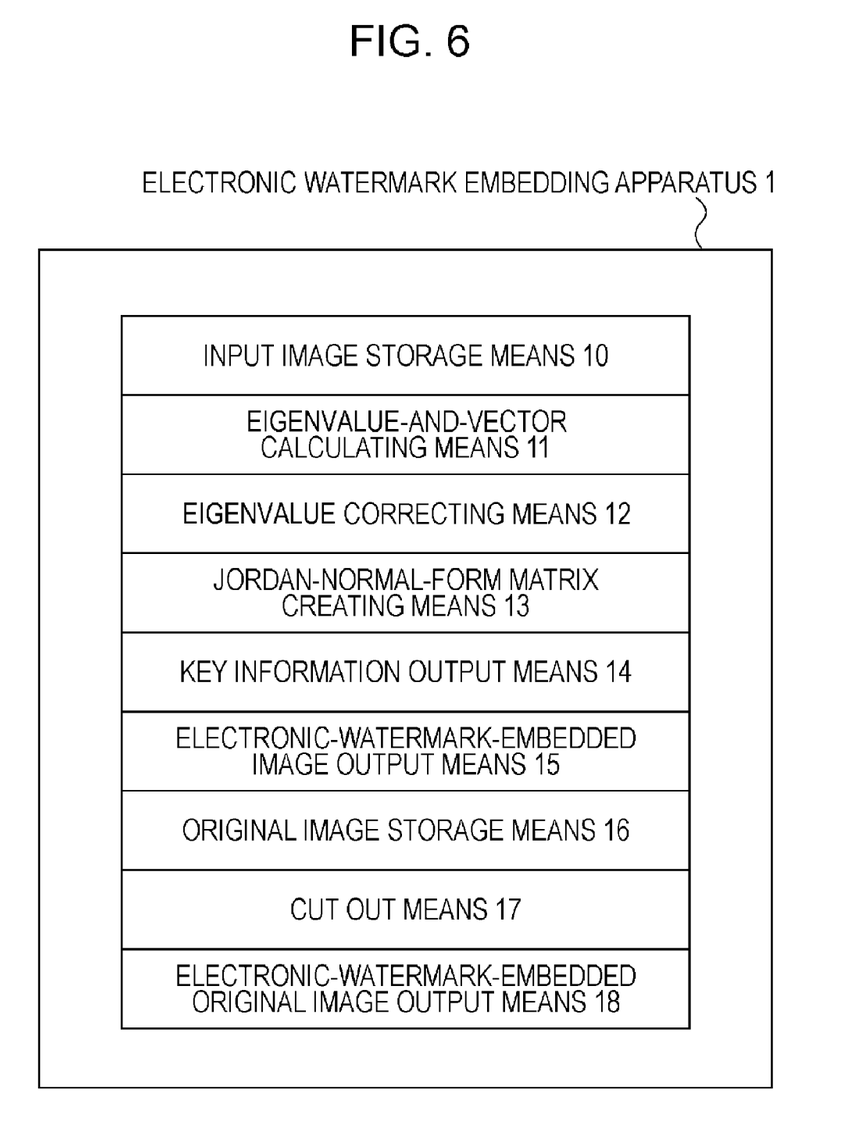
FIG. 6 is a block diagram showing the function configuration of the electronic watermark embedding apparatus 1 of a variation example.

More specifically, as shown in FIG. 6, the original image storage means 16 for storing an original image $I_o$ which is to be the target for embedding an electronic watermark, cut out means 17 for cutting out a partial image of n×n pixels from the original image $I_o$, storing the pixel matrix of the partial image as the pixel matrix G with n rows and n columns of the input image I in the input image storage means 10, and electronic-watermark-embedded original image output means 18 for replacing the partial image in the original image $I_o$ by the electronic-watermark-embedded image $I_w$ of the input image I output by the electronic-watermark-embedded image output means 15 to create and output an electronic-watermark-embedded image of the original image $I_o$ may further be provided. In this case, the cut out means 17 and electronic-watermark-embedded original image output means 18 may be configured in the same manner as a cutout function module and synthesis function (insertion function) module included in a normal image editing apparatus.

Even when the original image $I_o$ which is to be the target for embedding an electronic watermark is not square, it is possible to cut out a partial image of n×n pixels from the original image $I_o$, embed an electronic watermark to the partial image on the basis of the framework of the present invention, and return (or insert) the embedded partial image to the original image $I_o$. Thus, with the above configuration, the electronic watermark can be embedded to the original image $I_o$.

For example, according to the second embodiment, if it is determined that the matrix $S_k$ corresponds to a Jordan-normal-form matrix, it is determined that the examination target image $I_k$ is the electronic-watermark-embedded image $I_w$ of the input image I. However, the presence of an electronic watermark can be determined with higher precision by changing the configuration as follows.

First of all, the key information storage means 21 may store the eigenvalues $s_1$ to $s_n$ ($s_1 > s_2 > \ldots > s_n$) of the pixel matrix G with n rows and n columns of the input image I as electronic watermark key information, in addition to the eigenvectors $p_1$ to $p_n$ of the pixel matrix G.

For example, the key information output means 14 of the electronic watermark embedding apparatus 1 may also output the eigenvalues $s_1$ to $s_n$ when it embeds an electronic watermark to the input image I, and the electronic watermark examining apparatus 2 may acquire the eigenvalues $s_1$ to $s_n$ output by the key information output means 14 and store the key information storage means 21 in advance.

The presence-of-electronic-watermark determining means 23 may determine whether the matrix $S_k$ corresponds to the Jordan-normal-form matrix $S_w$ with n rows and n columns having m ($1 \leq m < n$) eigenvalues being one of the eigenvalues $s_1$ to $s_n$ and the remaining (n−m) eigenvalues being a multiple root with one of the m eigenvalues. If so, the presence-of-electronic-watermark determining means 23 may determine that the examination target image $I_k$ is the electronic-watermark-embedded image $I_w$ of the input image I. In this case, the correspondence may be determined by determining the agreement if the difference from the corresponding value is equal to or lower than a threshold value, like the second embodiment.

The expression "Jordan-normal-form matrix $S_w$ with n rows and n columns having m ($1 \leq m < n$) eigenvalues being one of the eigenvalues $s_1$ to $s_n$ and the remaining (n−m) eigenvalues being a multiple root with one of the m eigenvalues" refers to the general identification of the architecture of the Jordan-normal-form matrix acquired by the electronic watermark embedding step of the present invention.

With the configuration, instead of the determination that an electronic watermark is contained simply if the matrix $S_k$ corresponds to a Jordan-normal-form matrix, it is determined that an electronic watermark is contained if the matrix $S_k$ corresponds to the Jordan-normal-form matrix resulting from the electronic watermark embedding step of the present invention performed on the input image I. Therefore, the presence of an electronic watermark can be determined with higher precision.

The presence of an electronic watermark can also be determined with higher accuracy by changing the invention as follows.

First of all, the key information storage means 21 may store a Jordan-normal-form matrix $S_w$ as electronic watermark key information, in addition to the eigenvectors $p_1$ to $p_n$ of the pixel matrix G.

The Jordan-normal-form matrix $S_w$ is a Jordan-normal-form matrix acquired by selecting at least one pair of eigenvalues $(s_i, s_j)$ having different values from the eigenvalues $s_1$ to $s_n$ ($s_1 > s_2 > \ldots > s_n$) of the pixel matrix G with n rows and n columns of the input image I, correcting the acquired eigenvalues $s_1$ to $s_n$ such that the values of the selected pair can have an equal value by replacing one value of the selected pair by the other value, for example, and setting the corrected eigenvalues as diagonal elements and 1 as one of the nondiagonal elements corresponding to the selected pair, that is, the Jordan-normal-form matrix $S_w$ is the Jordan-normal-form matrix acquired by the electronic watermark embedding step of the present invention.

For example, the key information output means 14 in the electronic watermark embedding apparatus 1 may also output the Jordan-normal-form matrix $S_w$ when it embeds an electronic watermark to the input image I, and the electronic watermark examining apparatus 2 may acquire the Jordan-normal-form matrix $S_w$ output by the key information output means 14 and store the key information storage means 21, in advance.

The presence-of-electronic-watermark determining means 23 may determine whether the matrix $S_k$ corresponds to the Jordan-normal-form matrix $S_w$ stored in the key information storage means 21. If so, the presence-of-electronic-watermark determining means 23 may determine that the examination target image $I_k$ is the electronic-watermark-embedded image $I_w$ of the input image I. Also in this case, the correspondence may be determined by determining the agreement if the difference from the corresponding value is equal to or lower than a threshold value, like the second embodiment.

With the configuration, as same as described above, instead of the determination that an electronic watermark is contained simply if the matrix $S_k$ corresponds to a Jordan-normal-form matrix, it is determined that an electronic watermark is contained if the matrix $S_k$ corresponds to the Jordan-normal-form matrix $S_w$ resulting from the electronic watermark embedding step of the present invention performed on the input image I. Therefore, the presence of an electronic watermark can be determined with higher precision.

Notably, the present invention is also applicable to data (such as audio data) excluding image data. In order to apply the present invention to data excluding image data, the data may be transformed to two-dimensional array data with n rows and n columns under a predetermined rule (for example, if the data is one-dimensional data, a certain series of n data is handled as the first row, the next series of n data as the second row and so on to form a two-dimensional array with n rows and n columns). Then, the two-dimensional array data may be regarded as the pixel matrix G with n rows and n columns of the input image. In other words, the "image" in the present invention is the concept including not only general image data of a still picture or a frame image within a moving picture but also image data obtained as a result of the transformation of voice data and so on to a two-dimensional array.

REFERENCE NUMERALS 1 electronic watermark embedding apparatus
2 electronic watermark examining apparatus
10 input image storage means
11 eigenvalue-and-vector calculating means
12 eigenvalue correcting means
13 Jordan-normal-form matrix creating means
14 key information output means
15 electronic-watermark-embedded image output means
16 original image storage means
17 cut out means
18 electronic-watermark-embedded original image output means
20 examination target image storage means
21 key information storage means
22 diagonalization computing means
23 presence-of-electronic-watermark determining means

The invention claimed is:

1. An electronic watermark embedding apparatus comprising:
   input image storage means for storing a pixel matrix G with n rows and n columns of an input image;
   eigenvalue-and-vector calculating means for acquiring eigenvalues $s_1$ to $s_n$ ($s_1 > s_2 > \ldots > s_n$) and eigenvectors $p_1$ to $p_n$ of the pixel matrix G read from the input image storage means;
   eigenvalue correcting means for selecting at least one pair of eigenvalues $(s_i, s_j)$ having different values from the acquired eigenvalues $s_1$ to $s_n$ and correcting the acquired eigenvalues $s_1$ to $s_n$ such that the values of the selected pair can be equal;
   means for creating a Jordan-normal-form matrix $S_w$ having the corrected eigenvalues as diagonal elements and 1 as one of the nondiagonal elements corresponding to the selected pair;
   means for outputting the acquired eigenvectors $p_1$ to $p_n$ as electronic watermark key information;

means for performing the inverse transform of diagonalization computing on the created matrix $S_w$ by using the acquired eigenvectors $p_1$ to $p_n$ to create a pixel matrix $G_w$ with n rows and n columns thereby and outputting it as an electronic-watermark-embedded image of the input image.

2. The electronic watermark embedding apparatus according to claim 1, wherein the eigenvalue correcting means replaces one value of the selected pair by the other value to correct the acquired eigenvalues $s_1$ to $s_n$ such that the selected pair can have equal values.

3. The electronic watermark embedding apparatus according to claim 1, further comprising:
original image storage means for storing an original image which is to be the target for embedding an electronic watermark;
means for cutting out a partial image of n×n pixels from the original image and storing a pixel matrix of the partial image in the input image storage means as the pixel matrix G with n rows and n columns of the input image; and
means for replacing the partial image in the original image by the electronic-watermark-embedded image of the input image to create an electronic-watermark-embedded image of the original image and outputting it.

4. The electronic watermark embedding apparatus according to claim 1, wherein:
if the pixel matrix G is an irregular matrix of a rank r (r<n), the eigenvalue-and-vector calculating means determines one or more positive values, each of which is lower than the eigenvalue $s_r$, as the eigenvalues $s_{(r+1)}$ to $s_n$ of the pixel matrix G and determines one or more fundamental vectors as the eigenvector of the determined eigenvalues $s_{(r+1)}$ to $s_n$.

5. An electronic watermark examining apparatus comprising:
examination target image storage mean for storing a pixel matrix $G_k$ with n rows and n columns of an examination target image;
key information storage means for storing eigenvectors $p_1$ to $p_n$ of a pixel matrix G with n rows and n columns of an input image as electronic watermark key information;
means for performing diagonalization computing on the pixel matrix $G_k$, which is read from the examination target image storage means, by using the eigenvectors $p_1$ to $p_n$ to create a matrix $S_k$ with n rows and n columns; and
determining means for determining whether the created matrix $S_k$ corresponds to a Jordan-normal-form matrix or not, and, if so, determines the examination target image is an electronic-watermark-embedded image of the input image and outputting the determination result.

6. The electronic watermark examining apparatus according to claim 5, wherein:
the key information storage means further stores eigenvalues $s_1$ to $s_n$ ($s_1$>$s_2$>...>$s_n$) of the pixel matrix G with n rows and n columns of the input image as electronic watermark key information; and
the determining means determines whether the created matrix $S_k$ corresponds to a Jordan-normal-form matrix $S_w$ with n rows and n columns having m (1≦m<n) eigenvalues being one of the eigenvalues $s_1$ to $s_n$ and the remaining (n−m) eigenvalues being a multiple root with one of the m eigenvalues or not, and, if so, determines that the examination target image is an electronic-watermark-embedded image of the input image.

7. The electronic watermark examining apparatus according to claim 5, wherein:
the key information storage means further stores a Jordan-normal-form matrix $S_w$ as electronic watermark key information;
the determining means determines whether the created matrix $S_k$ corresponds to the Jordan-normal-form matrix $S_w$ or not, and, if so, determines that the examination target image is an electronic-watermark-embedded image of the input image; and
the Jordan normal form $S_w$ is a Jordan-normal-form matrix acquired by selecting at least one pair of eigenvalues having different values from eigenvalues $s_1$ to $s_n$ ($s_1$>$s_2$>...>$s_n$) of the pixel matrix G, correcting the acquired eigenvalues $s_1$ to $s_n$ such that the selected pair can have equal values, setting the corrected eigenvalues as diagonal elements, and setting 1 as one of the nondiagonal elements corresponding to the selected pair.

8. An electronic watermark embedding method comprising:
the step of reading a pixel matrix G with n rows and n columns of an input image from input image storage means storing the pixel matrix G;
an eigenvalue and vector calculating step of acquiring the eigenvalues $s_1$ to $s_n$ ($s_1$>$s_2$>...>$s_n$) and eigenvectors $p_1$ to $p_n$ of the read pixel matrix G;
an eigenvalue correcting step of selecting at least one pair of eigenvalues ($s_i$,$s_j$) having different values from the acquired eigenvalues $s_1$ to $s_n$ and correcting the acquired eigenvalues $s_1$ to $s_n$ such that the selected pair can have equal values;
the step of creating a Jordan-normal-form matrix $S_w$ having the corrected eigenvalues as diagonal elements and having 1 as one of the nondiagonal elements corresponding to the selected pair;
the step of outputting the acquired eigenvectors $p_1$ to $p_n$ as electronic watermark key information; and
the step of performing the inverse transform of diagonalization computing on the created matrix $S_w$ by using the acquired eigenvectors $p_1$ to $p_n$ to create a pixel matrix $G_w$ with n rows and n columns thereby and outputting it as an electronic-watermark-embedded image of the input image.

9. A program, stored on a non-transitory computer readable medium, for causing a computer to execute the electronic watermark embedding method according to claim 8.

10. The electronic watermark examining method comprising the steps of:
reading a pixel matrix $G_k$ with n rows and n columns of an examination target image from examination target image storage means storing the pixel matrix $G_k$;
reading eigenvectors $p_1$ to $p_n$ of the pixel matrix G with n rows and n columns of the input image as electronic watermark key information from key information storage means storing eigenvectors $p_1$ to $p_n$;
performing diagonalization computing on the read pixel matrix $G_k$ by using the read eigenvectors $p_1$ to $p_n$ to create a matrix $S_k$ with n rows and n columns;
determining whether the created matrix $S_k$ corresponds to a Jordan-normal-form matrix or not; and
if the created matrix $S_k$ corresponds to a Jordan-normal-form matrix, determining that the examination target image is an electronic-watermark-embedded image of the input image and outputting the determination result.

11. A program, stored on a non-transitory computer readable medium, for causing a computer to execute the electronic watermark examining method according to claim 10.

* * * * *

UNITED STATES PATENT AND TRADEMARK OFFICE
CERTIFICATE OF CORRECTION

| | | |
|---|---|---|
| PATENT NO. | : 7,881,492 B2 | Page 1 of 1 |
| APPLICATION NO. | : 12/665601 | |
| DATED | : February 1, 2011 | |
| INVENTOR(S) | : Ohzeki | |

It is certified that error appears in the above-identified patent and that said Letters Patent is hereby corrected as shown below:

In Fig. 4(B), Sheet 4 of 6, delete "MEANS23" and insert -- MEANS 23 --, therefor.

In Column 1, Line 54, delete "121-128" and insert -- 121-128. --, therefor.

In Column 1, Line 58, delete "593-594" and insert -- 593-594. --, therefor.

In Column 4, Line 5, delete "$di_{sk}$" and insert -- disk --, therefor.

In Column 7, Line 46, delete "$I_w$(that" and insert -- $I_w$ (that --, therefor.

In Column 14, Line 7, in Claim 7, delete "eigenvalues" and insert -- eigenvalues ($s_i$, $s_j$) --, therefor.

Signed and Sealed this
Twenty-eighth Day of August, 2012

David J. Kappos
*Director of the United States Patent and Trademark Office*